April 20, 1971 — H. H. BAHRENBURG — 3,575,814
VAPORIZATION APPARATUS WITH FILMING AND COMPRESSION MEANS
Filed Feb. 24, 1969
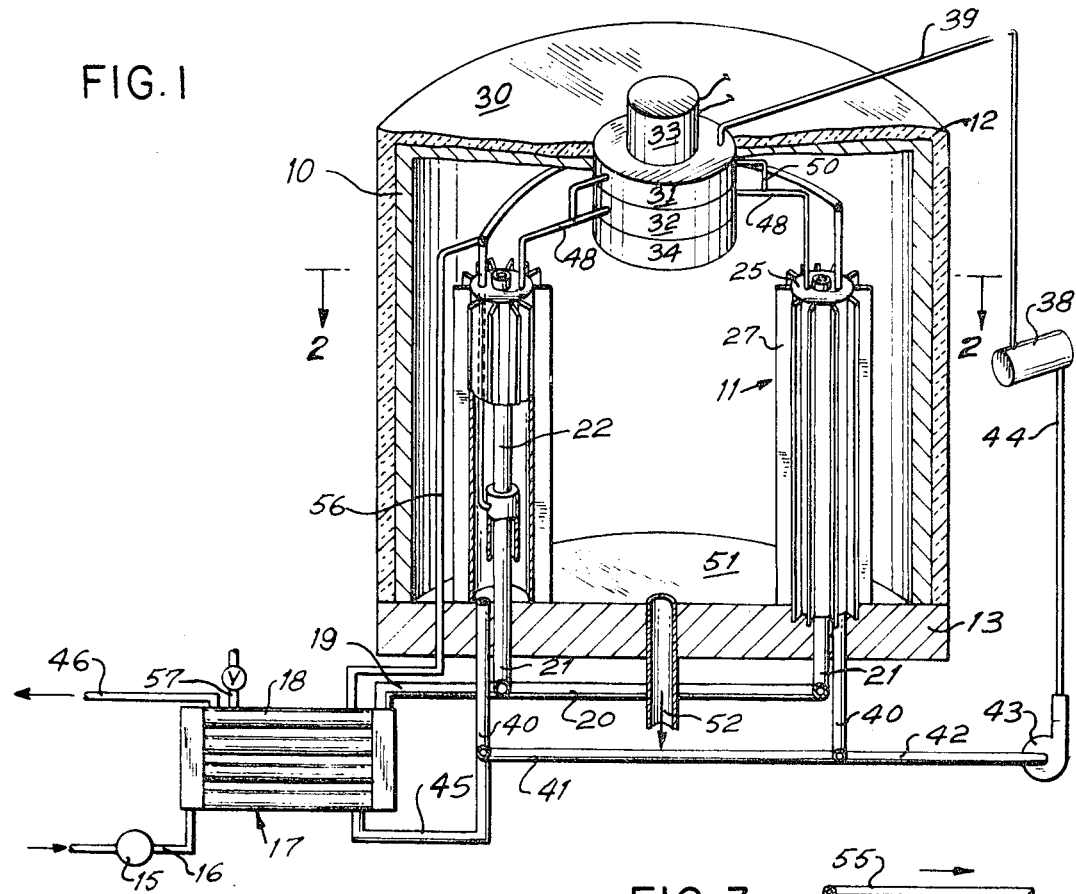
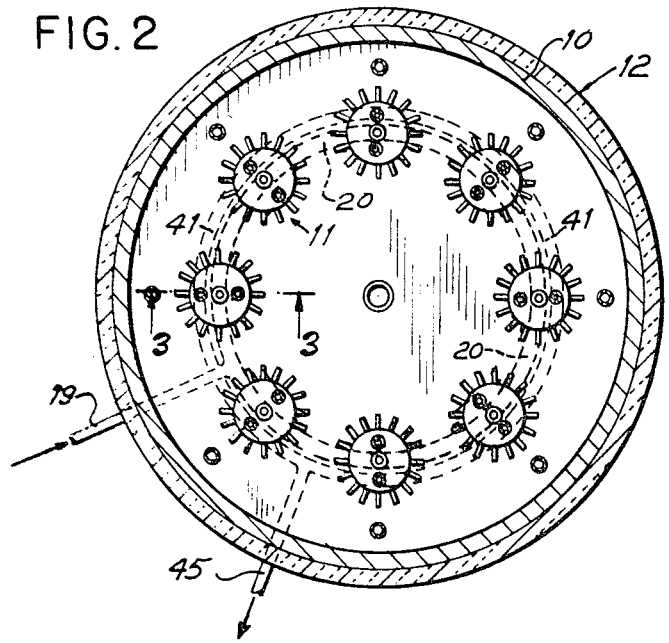
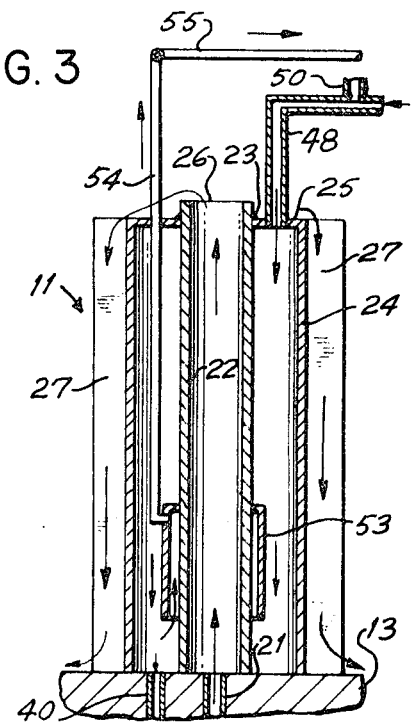

3,575,814
Patented Apr. 20, 1971

3,575,814
VAPORIZATION APPARATUS WITH FILMING AND COMPRESSION MEANS
Harry H. Bahrenburg, 11 Sherman Court,
Bethpage, N.Y. 11714
Filed Feb. 24, 1969, Ser. No. 801,415
Int. Cl. B01d *3/00*
U.S. Cl. 202—172                                    4 Claims

ABSTRACT OF THE DISCLOSURE

This invention relates to an apparatus used, for example, for recovering fresh potable water from saline water, such as sea water. The apparatus includes a vapor compressor to obtain a condensation temperature slightly higher than the boiling point of water. The compressed vapors are conducted into a plurality of finned vertically disposed tower cells over the surface of which the sea water falls as a thin film to produce a large amount of water vapors. The apparatus also includes a single large container in which the finned vaporization cells are disposed.

---

The art for recovering fresh, potable water from sea water is voluminous. Often the desert areas are located near sea water and have an abundant supply of petroleum, as in Arabia and Libya. The use of procedures for recovery of fresh water using distillation are quite common in such areas. However, distillation procedures produce a serious scaling problem and are expensive to operate.

In summary, this invention is concerned with producing fresh, potable water economically by the use of a novel apparatus. The inventive concept includes that of falling film of hot sea water flowing down tower cell surface and fins, heated by latent heat of condensation from compressed condensing vapors to produce an abundant amount of fresh water vapors to be compressed and conducted to the interior of said cells to produce further condensation. The compressed vapors have a condensation temperature slightly higher than that of the boiling point of water, and so, are very effective in evaporating fresh water vapors from the sea water film on said fins and adjacent surface.

It is an object of this invention to produce fresh, potable water from sea water at minimum expense both as to cost of apparatus and also as to cost of operation.

It is another object to provide an apparatus having a large suitably hot falling film surface to effect a rapid and abundant production of compressible fresh water vapors.

It is a further object to provide an apparatus capable of producing at least three gallons of fresh, potable water for each gallon of concentrated brine effluent.

These and other objects will become apparent upon reading the following descriptive disclosure of an illustrative embodiment in which, FIG. 1 is a cross-section schematic view of the overall apparatus showing two of the several finned tower cells used to produce immense falling film vaporization surface and its resultant large volume of fresh water vapor, showing also the arrangement of the cells within a single cylindrical container and the location of the steam generator as well as that of the steam turbine, electrical generator and vapor compressor disposed in the roof of the container, FIG. 2 is a view taken substantially on line 2—2 of FIG. 1 and showing the preferred form of circular arrangement of the finned tower cells and FIG. 3 is a section view taken on line 3—3 of FIG. 2 and showing in detail the preferred construction of the individual tower cells.

Turning to the drawing, a tall, for example, thirty foot high by fifty-foot diameter preferably cylindrical container 10 is provided interiorly thereof with a plurality of finned tower cells 11 adapted for rapid and voluminous vaporization of hot falling film of sea water.

The container 10 may be made of suitable metal or concrete and is preferably provided with an outer layer of heat insulating material 12 such as foam rubber, glass wool or the like and with an inner anti-corrosion liner.

The base 13 of the container 10 is preferably made of suitably thick, suitably supported concrete and is provided with suitable apertures therein for the incoming sea water and the outgoing fresh, potable water from the many cells, as well as with a brine outlet.

The incoming sea water is propelled by a preferably electrical pump 15 through pipe 16 into a heat exchanger 17, where it flows through conduits 18 surrounded by hot fresh, potable water, to outlet pipe 19 and into the circular distribution header 20. Individual pipes 21 lead from the heated sea water header 20 through the base 13 into the center of the individual cells 11.

The cells 11 are each provided with a control pipe 22 hermetically sealed as by welding 23 to a cylindrical wall 24 at its flat top portion 25. As seen in FIG. 3, pipe 22 extends above the top wall 25 to permit an overflow of sea water from the opening 26 down the exterior wall 24. To increase the evaporating surface of exterior vertical wall 24, a plurality of suitably large fins 27 are secured as by welding around the exterior surface of walls 24.

On and through the center of roof 30 of the container 10 there is disposed a steam turbine 31, a vapor compressor 32, an electrical generator above roof 30 and a mist eliminator 34 below the compressor 32. Preferably, the generator 33, turbine 31 and vapor compressor 32 are all on a common shaft or its equivalent. The mist eliminator is of conventional construction, being preferably interwoven stainless steel wire or mesh material adapted to condense mist droplets of water from water vapor. The steam turbine 31 is energized by steam from the steam generator 38 by steam pipe 39. The steam used in the steam generator is part of the fresh water recovered from the sea water. The fresh water comes from the cells 11 by way of pipes 40 into a common header 41.

A pipe 42 connects the fresh, potable water header 41 to a pump 43 that pumps the hot water through the pipe 44 into the steam generator 38.

The remaining hot fresh water from header 41 passes through pipe 45 around conduits 18 of the heat exchanger 17 and out through pipe 46. Thus, in the heat exchanger 17 the cool sea water is initially heated by the hot fresh water effluent. After the sea water overflows pipe 22, it falls by suitable regulation of pump 15 as a suitably thin film down exterior walls 24 and fins 27, said surfaces being heated by the compressed condensing fresh water vapors conducted into the cells 11 by the several pipes 48, each leading from the compressor 32 to the top wall 25 of respective cells 11. The cells 11 are also heated by condensing exhaust steam from turbine 31, conducted through the several pipes 50 and pipes 48 into respective cells.

As shown in FIG. 3, the compressed water vapor and exhaust steam enter the cells by a pipe 48. Here the water vapor in the cell is condensed by contact with the exterior surface of pipe 22 containing the relatively cool sea water from the heat exchanger 17 and also by contact with the interior surface of wall 24 cooled by vaporizing sea water, turning the water vapor into liquid water with transfer of its latent heat of condensation.

The now relatively hot seat water overflowing the pipe 22 outlet 26 falls by gravity down walls 24 and fins 27, which are relatively hot since they are transferring the latent heat of condensation. Thus the boiling falling sea water film releases copious amounts of fresh water vapor before the remaining discard brine reaches the surface 51 of the base 13. The concentrated hot brine then is conducted through pipe 52 to an exterior weathering pond for recovery of salts, if desired.

The large volume of water vapor in container 10 is sucked into the vapor compressor and is compressed to yield a condensation temperature of about 221 degrees F. and is piped directly into the cells 11.

Any non-condensible gases present in the sea water and thus in the compressed vapor are collected in collar 53 and passed up conduit 54 to a header 55. These non-condensible gases may be vented directly to the atmosphere or they may be conducted by pipe 56 to the heat exchanger 17 and vented therefrom by a valved pipe 57.

The temperature of the sea water at the overflow opening 26 is about 212 degrees F., whereas the brine effluent temperature is about 211 degrees F. and the compressed water vapor temperature in pipe 48 is about 218 degrees F. Such a temperature relationship under the circumstances of vaporization set forth herein is advantageous to the economical production of fresh, potable water.

The essentials of this invention is the use of a steam turbine driven vapor compressor co-acting with a vertical cell vaporizer for vaporizing sea water on the cells exterior surface, preferably finned to produce a larger area of vaporization, said cell functioning also as a condenser-heat exchanger of water vapor at its center conduit and outer wall 24 interior surface.

Thus the apparatus of this invention may be electrically motivated in lieu of the use of the steam generator 38, steam turbine 32 and electrical generator 33. Under such circumstances the vapor compressor is motivated by a motor and the system is equipped with a suitable auxiliary make-up heat exchanger and an external heat source.

The unit as shown in the drawing is self-contained in that it makes its own electricity to regulate and operate the various pumps and for general utility purposes.

Moreover, while the unit is operable without fins, clearly the addition of fins greatly increases the evaporating surface. Fins may also be added to the interior of walls 24 and to the exterior surface of conduits 22.

In summation, the primary feature of this invention is the provision of condenser-vaporizer cells within a container that functions also as a vapor chamber and mist disengaging volume. The cells function both as a secondary and primary condenser, using a centrally disposed relatively cool sea water conduit, and a latent heat transfer vaporizer using the outside cylindrical surface, preferably with fins, as vaporizing surface, respectively.

The steam turbine provides the system rotative power. Its residual vapor exhaust thermal energy is the sole source of make-up heat input to balance out system inherent and unavoidable heat losses. This exhaust steam brings the system up to operating temperature during start-up.

What is claimed is:

1. A distillation apparatus embodying a complete system for separating a distillate from a distilland, like seawater or brackish water, to produce a good quality, low cost, potable water; said apparatus comprising an insulated cylindrical housing; a plurality of cylindrical, extended surface, multi-duty tower cells disposed circularly in said housing; a feed water inlet control pipe centrally sealed in each tower cell and extending suitably thereabove for the conduction of conditioned feed water containing non-condensible gas to overflow the top of said cells and then flow down the cell exterior walls in a thin film for the express purpose of distillate vapor generation by way of evaporation; a steam generator vaporizing recovered potable water, communicating with a steam turbine-vapor compressor-electric generator power unit affixed centrally in said housing roof; connecting piping leading from said compressor exhaust to said tower cells for conducting compressed distillate vapors generated in said housing interior volume, and conducting piping from said turbine exhaust, joining the above compressor exhaust piping, and where both these combined piping systems enter the annular space at top of said tower cells; said condensible vapors and non-condensible gases engaging the outer control pipe surface in secondary condensation with accompanying feed water heating, and engaging the interior surface of said tower cells in primary condensation with accompanying distillate vaporization on the outer surface of said cells; and a mist eliminator mounted at the compressor inlet for disengaging salt containing mist from distillate vapors in said housing prior to conduction of vapors into said compressor; and non-condensible vent collars affixed to the outer surface of each control pipe, near its base, to separate non-condensible gases from condensible vapors and simultaneously reclaim the sensible heat and latent heat of condensation respectively therefrom, returning said heat by way of heat transfer to the relatively cool rising feed water in the interior of each control pipe; and said condensed condensible vapor being returned to the respective said tower cell annular space while the cooled non-condensible gases are vented from these collar chambers by an outlet conduit connected from the top of each collar chamber to a piping header communicating to the atmosphere through an external heat exchanger; an outlet conduit from the annular space of each cell base communicating with a common header for condensed potable water removal and recovery; a heat exchanger communicating with said potable water header for removal of heat therefrom and to transfer same to counterflowing feed seawater flowing in said heat exchanger; a pipe for removal of brine from said housing interior base by overflow thereof; and connecting piping for conducting potable water to storage and to said steam generator by way of a boiler feed pump powered by said electric generator thru an electric motor.

2. The distillation apparatus of claim 1 wherein said multiple number of tower cells, each with a control feed pipe conducting relatively cool upflowing feed water that is heated enroute and spills out and over the tower shell exterior surface; with said upflowing feed water in counterflow pattern with incoming, down flowing vapor, thereby providing suitable heat transfer conditions to raise the feed water to the system boiling temperature at point of overflow; with said control feed pipe having a suitable amount of extended surface for most effective heat transfer; and said control feed pipe providing structural support to each respective cell.

3. The distillation apparatus of claim 1 with said multiple number of tower cells wherein each annular space has a water sealed bottom and wherein said central control pipe spills a thin film of boiling distilland feed water over the outside of said tower cells, a large suitably hot surface, in a manner to effect a rapid and abundant production of compressible fresh water vapors; and said water sealed tower annular space bottoms being effectively closed by the presence of recoverable product water to insure maximum temperature differential across tower shell by way of maximum interior pressure maintenance for the economical production of fresh, potable water; and said water sealed tower bottom providing proper dropwise distillate flow down the interior tower surface by way of a uniform downward vapor flow; and each said tower cell being fastened and supported at the base, and able to withstand the riggors of the service imposed upon them; and said tower cells expanding and contracting with temperature change.

4. The distillation apparatus of claim 1 wherein said power unit consists of a close coupled steam turbine driving a vapor compressor and an electric generator on a common shaft arrangement; and connecting piping to use turbine exhaust steam in direct condensation in the tower cell annular spaces resulting in low back-pressure turbine operation, and additional source of heat to enhance tower cell heat transfer; and direct heat utilization to recoup required system make-up heat; and said compressor on a common shaft with the steam turbine utilizing the same bearing support.

References Cited

UNITED STATES PATENTS

| | | | |
|---|---|---|---|
| 3,457,142 | 7/1967 | Starmer | 202—197 |
| 3,461,041 | 8/1969 | Synder | 203—26 |
| 3,161,574 | 12/1964 | Elam | 203—11 |
| 3,175,962 | 3/1965 | Holtslag | 203—89 |
| 3,190,817 | 6/1965 | Neugebauer et al. | 203—26 |
| 3,227,630 | 1/1966 | Beckman | 203—89 |
| 3,244,601 | 4/1966 | Diedrich | 203—89 |
| 3,279,525 | 10/1966 | Takahashi | 159—13(B) |
| 3,312,600 | 4/1967 | Morton | 202—197 |
| 3,319,400 | 5/1967 | Wilson et al. | 202—197 |
| 3,356,591 | 12/1967 | Peterson | 203—49 |
| 3,385,768 | 5/1968 | Yost | 202—197 |
| 3,397,730 | 8/1968 | Fritz | 203—89 |

WILBUR L. BASCOMB, JR., Primary Examiner

U.S. Cl. X.R.

60—95; 159—13, 24; 202—186, 187, 197, 236; 203—11, 89, 26, DIG 16, DIG 17, DIG 20